(12) United States Patent
Inagi et al.

(10) Patent No.: US 10,725,654 B2
(45) Date of Patent: Jul. 28, 2020

(54) METHOD OF DISPLAYING IMAGE SELECTED FROM MULTIPLE IMAGES ON TOUCH SCREEN

(71) Applicants: KABUSHIKI KAISHA TOSHIBA, Tokyo (JP); TOSHIBA TEC KABUSHIKI KAISHA, Tokyo (JP)

(72) Inventors: Tatsuya Inagi, Izu Shizuoka (JP); Masaki Narahashi, Tokyo (JP); Hiroyo Tanaka, Tokyo (JP); Sou Miyazaki, Kawasaki Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 455 days.

(21) Appl. No.: 15/717,469

(22) Filed: Sep. 27, 2017

(65) Prior Publication Data
US 2018/0246637 A1 Aug. 30, 2018

(30) Foreign Application Priority Data

Feb. 24, 2017 (JP) ................................ 2017-033125

(51) Int. Cl.
*G06F 17/00* (2019.01)
*G06F 3/0488* (2013.01)
*G06K 9/00* (2006.01)
*G06F 3/0483* (2013.01)
*G06F 3/048* (2013.01)
(Continued)

(52) U.S. Cl.
CPC .......... *G06F 3/04883* (2013.01); *G06F 3/048* (2013.01); *G06F 3/0483* (2013.01); *G06F 3/0485* (2013.01); *G06F 3/0488* (2013.01); *G06F 3/04855* (2013.01);
(Continued)

(58) Field of Classification Search
CPC .... G06F 3/04883; G06F 3/017; G06F 3/0485; G06F 3/0488
See application file for complete search history.

(56) References Cited

U.S. PATENT DOCUMENTS 6,041,323 A * 3/2000 Kubota ............... G06F 16/3341
8,359,535 B2    1/2013 Watanabe et al.
(Continued)

OTHER PUBLICATIONS

Extended European Search Report dated Jun. 20, 2018, mailed in counterpart European Application No. 18156534.2, 12 pages.

*Primary Examiner* — Mohammed H Zuberi
(74) *Attorney, Agent, or Firm* — Kim & Stewart LLP

(57) ABSTRACT

A method for displaying an image selected from a plurality of images on a touch screen includes following steps. The steps are displaying an image among the plurality of images, each of which is associated with different one of consecutive identification numbers, and upon detecting a writing operation of a numerical value, storing the numerical value in a memory. When a first swipe operation in a first direction is detected after the writing operation, one of the images associated with an identification number that is equal to an identification number of the displayed image plus the stored numerical value is displayed. When a second swipe operation in a second direction opposite to the first direction is detected after the writing operation, one of the images associated with an identification number that is equal to the identification number of the displayed image minus the stored numerical value.

20 Claims, 12 Drawing Sheets

(51) Int. Cl.
  *G06F 3/0485* (2013.01)
  *G06F 3/0482* (2013.01)
  *G06F 3/0354* (2013.01)

(52) U.S. Cl.
  CPC ...... *G06K 9/00402* (2013.01); *G06F 3/03545* (2013.01); *G06F 3/0482* (2013.01)

(56) References Cited

U.S. PATENT DOCUMENTS

| | | | | |
|---|---|---|---|---|
| 9,747,002 | B2* | 8/2017 | Yakishyn | G06F 3/0483 |
| 9,760,278 | B2* | 9/2017 | Chan | G06F 3/04883 |
| 9,841,821 | B2* | 12/2017 | Tu | G06F 3/017 |
| 10,001,917 | B2* | 6/2018 | Kim | G06F 3/04883 |
| 10,115,105 | B2* | 10/2018 | Viswanath | G06Q 20/322 |
| 10,175,859 | B2* | 1/2019 | Iwasaki | G06F 3/0483 |
| 2003/0156145 | A1* | 8/2003 | Hullender | G06F 3/04883 715/863 |
| 2007/0083828 | A1* | 4/2007 | Toriyama | G06F 3/0482 715/816 |
| 2007/0126716 | A1* | 6/2007 | Haverly | G06F 3/0346 345/179 |
| 2009/0267909 | A1* | 10/2009 | Chen | G06F 3/0483 345/173 |
| 2009/0273571 | A1* | 11/2009 | Bowens | G06F 3/03547 345/173 |
| 2010/0097322 | A1* | 4/2010 | Hu | G06F 3/04883 345/173 |
| 2010/0097337 | A1* | 4/2010 | Lin | G06F 3/04883 345/173 |
| 2010/0175018 | A1* | 7/2010 | Petschnigg | G06F 3/0483 715/776 |
| 2010/0192108 | A1* | 7/2010 | Liu | G06F 3/04883 715/863 |
| 2010/0229090 | A1* | 9/2010 | Newton | G06F 3/0428 715/702 |
| 2011/0041102 | A1* | 2/2011 | Kim | G06F 3/04883 715/863 |
| 2011/0083089 | A1* | 4/2011 | Pahud | G06F 3/0425 715/765 |
| 2011/0164029 | A1* | 7/2011 | King | G06F 3/04883 345/419 |
| 2011/0205170 | A1* | 8/2011 | Chang | G06F 3/04883 345/173 |
| 2012/0023462 | A1* | 1/2012 | Rosing | G06F 3/0483 715/863 |
| 2012/0221968 | A1* | 8/2012 | Patterson | G06F 3/0483 715/776 |
| 2014/0071074 | A1 | 3/2014 | Cousins et al. | |
| 2014/0168077 | A1* | 6/2014 | Hicks | G06F 3/04883 345/157 |
| 2014/0253463 | A1 | 9/2014 | Hicks | |
| 2015/0020009 | A1 | 1/2015 | Keane | |
| 2015/0256763 | A1 | 9/2015 | Niemi | |
| 2015/0277749 | A1 | 10/2015 | Eggert | |
| 2015/0324074 | A1 | 11/2015 | Van Winkle | |
| 2016/0357382 | A1 | 12/2016 | Metz et al. | |

* cited by examiner

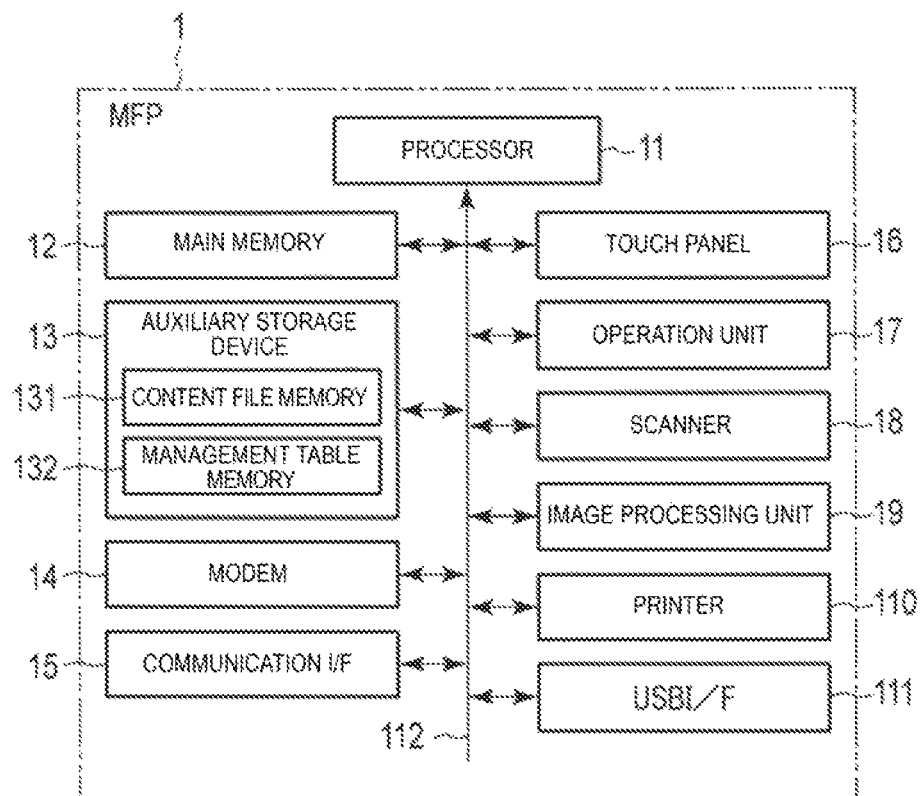

METHOD OF DISPLAYING IMAGE SELECTED FROM MULTIPLE IMAGES ON TOUCH SCREEN

CROSS-REFERENCE TO RELATED APPLICATION

This application is based upon and claims the benefit of priority from Japanese Patent Application No. 2017-033125, filed Feb. 24, 2017, the entire contents of which are incorporated herein by reference.

FIELD

Embodiments described herein relate generally to a method of displaying an image selected from multiple images on a touch screen.

BACKGROUND

Electronic devices having a touch panel display, such as smartphones, tablet terminals, multifunction peripherals typically have a function to switch a content image displayed on a touch screen thereof by swiping a panel surface.

However, even if this function is used, the number of content images is excessively large, an operation to display a desired content image on the panel surface is cumbersome and takes time. For this reason, a technique for displaying a desired content image among a plurality of content images with a simple operation with less time, is desirable.

DESCRIPTION OF THE DRAWINGS

FIG. 1 is a block diagram showing a configuration of a multifunction peripheral implementing a function of a display control device.

FIG. 2 schematically illustrates a data structure of a management table memory.

DETAILED DESCRIPTION

Figure 3:
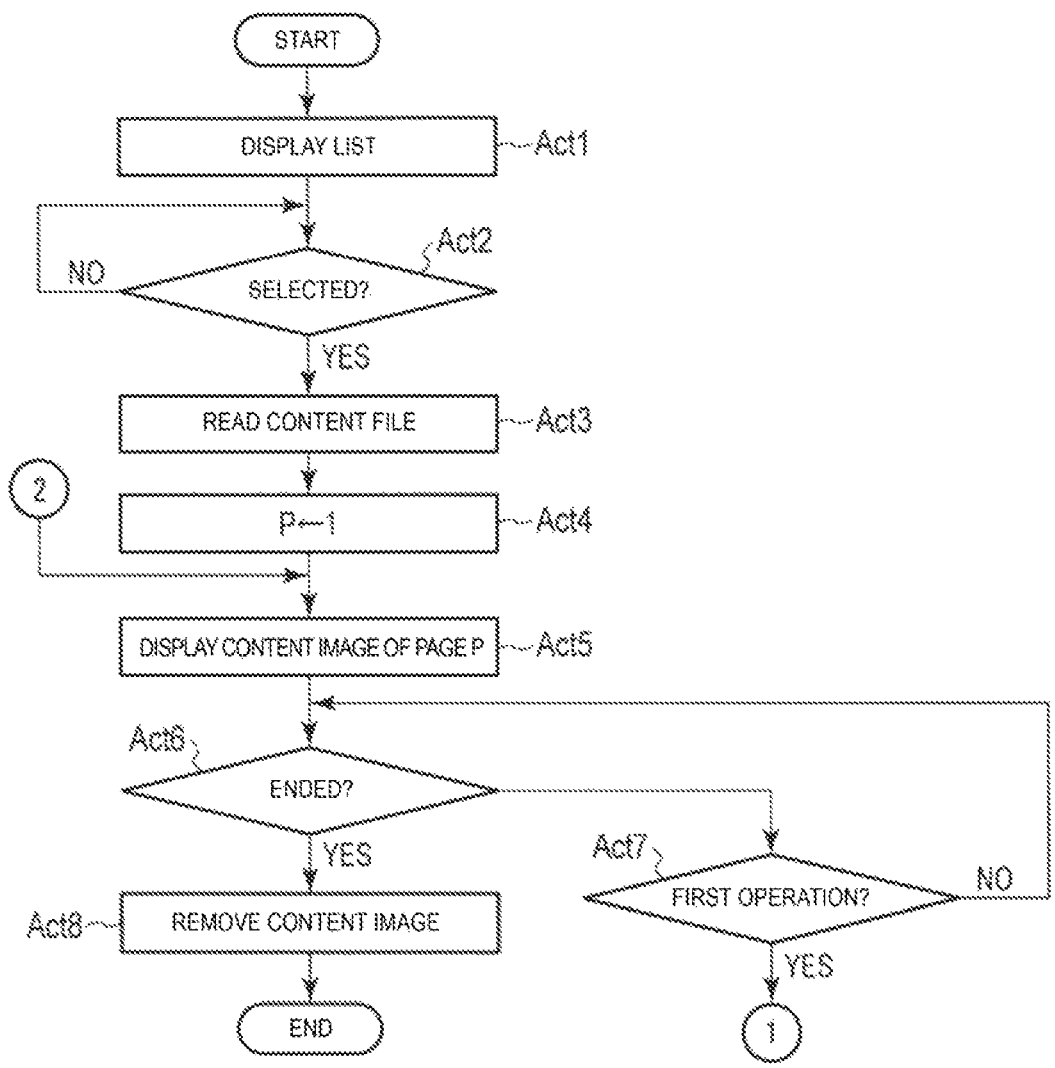
FIGS. 3 and 4 are each a flowchart showing a procedure of information processing executed by a processor according to a first embodiment.

An embodiment provides a display control device capable of displaying a desired content image among many content images with a simple operation with less time.

In general, according to an embodiment, a method for displaying an image selected from a plurality of images on a touch screen includes following steps. The steps are displaying, on the touch screen, at least one image among the plurality of images, each of the plurality of images being associated with different one of consecutive image identification numbers, upon detecting a writing operation of a numerical value that is performed by a user on the touch screen while said at least one image is displayed, storing the numerical value in a memory, when a first swipe operation in a first direction on the touch screen is detected after the writing operation, displaying, on the touch screen, one of the plurality of images associated with an image identification number that is equal to an image identification number of said at least one image plus the stored numerical value; and when a second swipe operation in a second direction opposite to the first direction on the touch screen is detected after the writing operation, displaying, on the touch screen, one of the plurality of images associated with an image identification number that is equal to the image identification number of said at least one image minus the stored numerical value.

Hereinafter, a plurality of embodiments relating to a display control device capable of displaying a desired content image among many content images with a simple operation in a short time will be described with reference to the drawings.

The display control device according to each embodiment is applied to a multifunction peripheral with a touch panel that displays an image scanned by a scanner function or an image received by a facsimile function (hereinafter, these images are referred to as content images in the embodiments) on a panel surface thereof.

First Embodiment

FIG. 1 is a block diagram showing a configuration of a multifunction peripheral 1 having a function of the display control device. The multifunction peripheral 1 includes a processor 11, a main memory 12, an auxiliary storage device 13, a modem 14, a communication interface 15, a touch panel 16, an operation unit 17, a scanner 18, an image processing unit 19, a printer 110, and a Universal Serial Bus (USB) interface 111. Furthermore, the multifunction peripheral 1 includes a system transmission path 112 and connects each of the above-mentioned components with the system transmission path 112 around the processor 11. That is, the multifunction peripheral 1 configures a computer by connecting the main memory 12 and the auxiliary storage device 13 to the processor 11 with the system transmission path 112.

The processor 11 corresponds to a central part of the computer. The processor 11 controls each unit to perform various functions as the multifunction peripheral 1 according to an operating system and an application program.

The main memory 12 corresponds to a main storage device of the computer. The main memory 12 includes a nonvolatile memory area and a volatile memory area. The main memory 12 stores the operating system and the application program in the nonvolatile memory area. In addition, there is also a case where the main memory 12 stores data necessary for the processor 11 to control each unit in the nonvolatile or the volatile memory area. The main memory 12 uses the volatile memory area as a work area, a display buffer or the like where data are appropriately rewritten by the processor 11.

The auxiliary storage device 13 corresponds to an auxiliary storage device of the computer. For example, a Hard Disk Drive (HDD), a Solid State Drive (SSD), an Electric Erasable Programmable Read-Only Memory (EEPROM), and the like are used as the auxiliary storage device 13. The auxiliary storage device 13 saves data used by the processor 11 for performing various kinds of processing and data generated by processing by the processor 11. There is also a case where the auxiliary storage device 13 stores the above-described application program.

The modem 14 is an interface for connecting to an external network line, for example, the Internet. The communication interface 15 is an interface for connecting to an internal network, for example, a Local Area Network (LAN). The touch panel 16 is a user interface of the multifunction peripheral 1. That is, the touch panel 16 includes a function as an input device of the multifunction peripheral 1 and a function as a display device. The operation unit 17 includes hard keys such as numeric keys, cursor keys, a copy start key, a preview button, and an end button. The scanner 18 optically scans an original document and converts an image of the original document into image data. The image processing unit 19 performs various kinds of processing on the image data received by facsimile via the modem 14 or the image data generated by the scanner 18. The printer 110 prints an image corresponding to the image data on a paper. As the printer 110, various systems such as an electrophotographic type and an ink jet type may be employed, but in the present embodiment, an electrophotographic system is used. The USB interface 111 is an interface with a USB device such as a USB memory.

The multifunction peripheral 1 having such a configuration includes a function as a display control device for displaying a content image on the panel surface of the touch panel 16. The function as the display control device is implemented by the processor 11, the main memory 12, the auxiliary storage device 13, and the image processing unit 19. Then, the multifunction peripheral 1 forms a content file memory 131 and a management table memory 132 in the auxiliary storage device 13 in order to perform the same function. In addition, the multifunction peripheral 1 stores a dedicated application program, a so-called display control program, in the main memory 12 or the auxiliary storage device 13 in order to perform the same function.

The content file memory 131 is an area for storing a content file in which content images are stored. A content file is generated by the image processing unit 19. The content file contains only one page of a content image or more than two pages of content images. The number of pages of the content images stored in one content file is not particularly limited as long as the number of pages does not exceed the storage capacity of the content file memory 131. Therefore, there may be a content file which stores content images exceeding tens of pages or hundred pages.

Every time a content file is generated by the image processing unit 19, a file name is given to the content file. The file name is unique and there is no overlap with the file names of other content files. For example, by including year, month, day, hour, minute, second at the time of creation in a file name, it is possible to create a unique file name.

A content file is deleted from the content file memory 131 when data of the content images stored in the file is output from the multifunction peripheral 1. That is, the content images are printed by the printer 110, whereby the content file is deleted. Alternatively, a content file is deleted by facsimile transmission of the content images by the modem 14. In addition, a content file is deleted also when the content images are transmitted to the outside via the USB interface 111 or the communication interface 15.

The management table memory 132 is an area for storing management data of the content file stored in the content file memory 131 in a table format. That is, as shown in FIG. 2, the management table memory 132, in association with the file name of the content file, stores the number of pages M of the content images stored in the content file. When storing a content file generated by the image processing unit 19 in the content file memory 131, the processor 11 adds the file name and the number of pages of the content file to the management table memory 132. In addition, every time the content file is deleted from the content file memory 131, the processor 11 deletes the file name and the number of pages of the content file from the management table memory 132.

Figure 4:
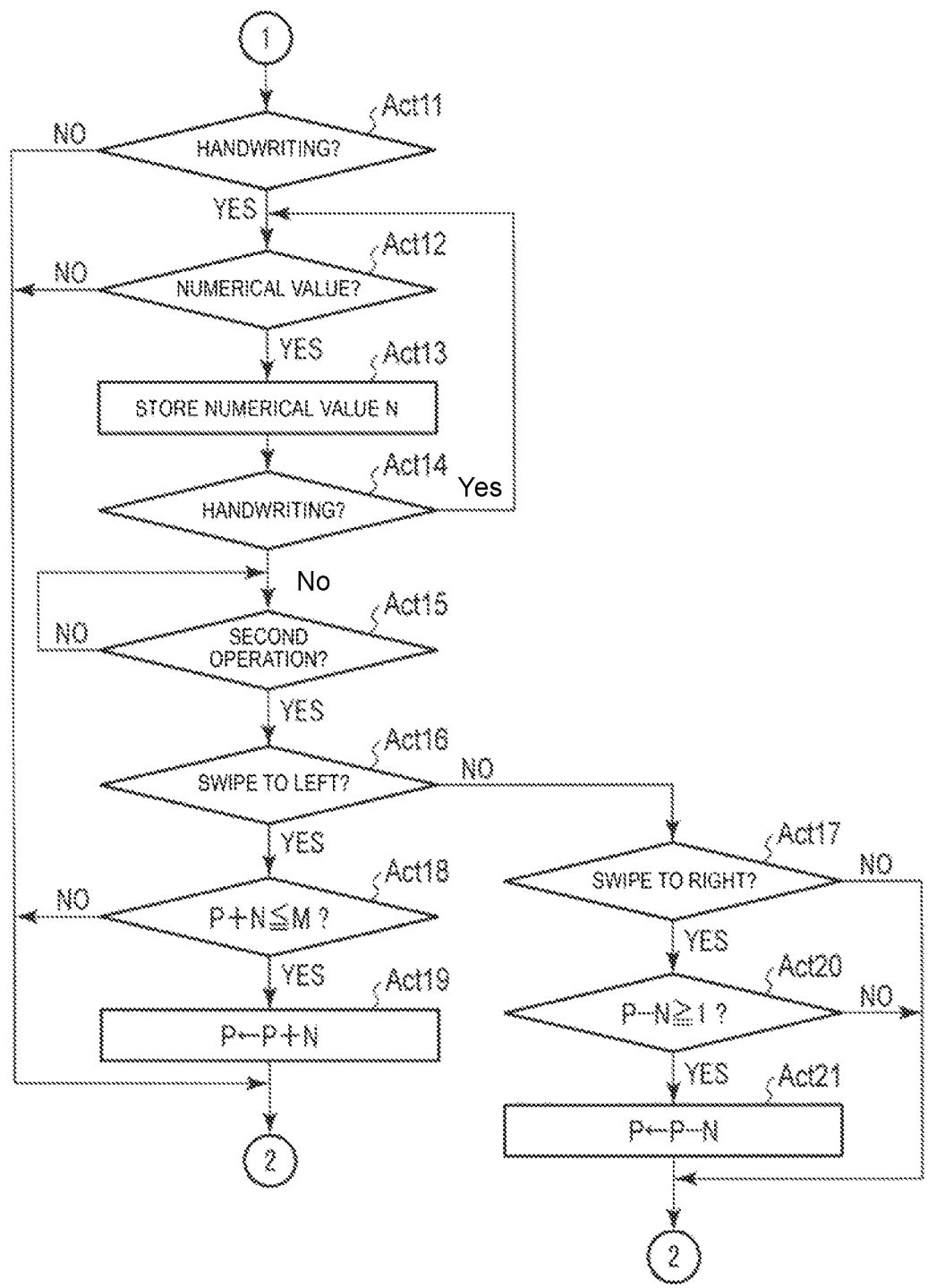

FIGS. 3 and 4 are flowcharts showing a procedure of display control processing executed by the processor 11 according to the display control program. The contents of the processing shown in FIGS. 3 and 4, and the processing described below are merely examples. As long as similar results can be obtained, the processing procedure and processing contents are not particularly limited.

First, a user who wants to check the content images on the panel surface of the touch panel 16 operates a preview button in the operation unit 17. By performing this operation, the processor 11 starts information processing according to the procedure shown in the flowchart of FIG. 3.

First, the processor 11 displays a content list on the touch panel 16 in Act 11. The content list is, for example, a list of the file names of the management data and the number of pages M stored in the management table memory 132. Data other than the file name and the number of pages M may be included in the content list. For example, an item for identifying whether or not the content of the file is a content of the images scanned by the scanner function or a content of the images received by the facsimile function may be added.

The user who checked a content list selects a content file storing content images that the user want to check on the panel surface from the list and touches, for example, the file name thereof. The operation for selecting a content file from the content list is not limited to a touch operation on a file name. The point is that the user can identify one content file from the content list.

The processor 11 that displayed the content list waits for a content file to be selected in Act 2. Then, upon checking that one content file is selected by a touch operation on the touch panel 16 (YES in Act 2), the processor 11 reads the selected content file from the content file memory 131 in Act 3 and stores the content images stored in the content file in the work area of the main memory 12. In addition, the processor 11 initializes a value P of a page number counter to "1" in Act 4. Then, in Act 5, the processor 11 develops the content image of which page number matches the value P of the page number counter from the content images stored in the work area in the display buffer and displays the content images on the panel surface of the touch panel 16.

With the above control, on the panel surface of the touch panel 16, among the content images stored in the content file selected from the content list, the content image on the P-th page is displayed on the panel surface of the touch panel 16. The user who checked the content image on the P-th page operates an end button in the operation unit 17 when finishing the checking work. If the user also wants to check the content image on another page, the user performs a predetermined first operation on the panel surface and then performs a second operation.

Here, the first operation and the second operation in the first embodiment will be described with reference to FIG. 5.

Figure 5:
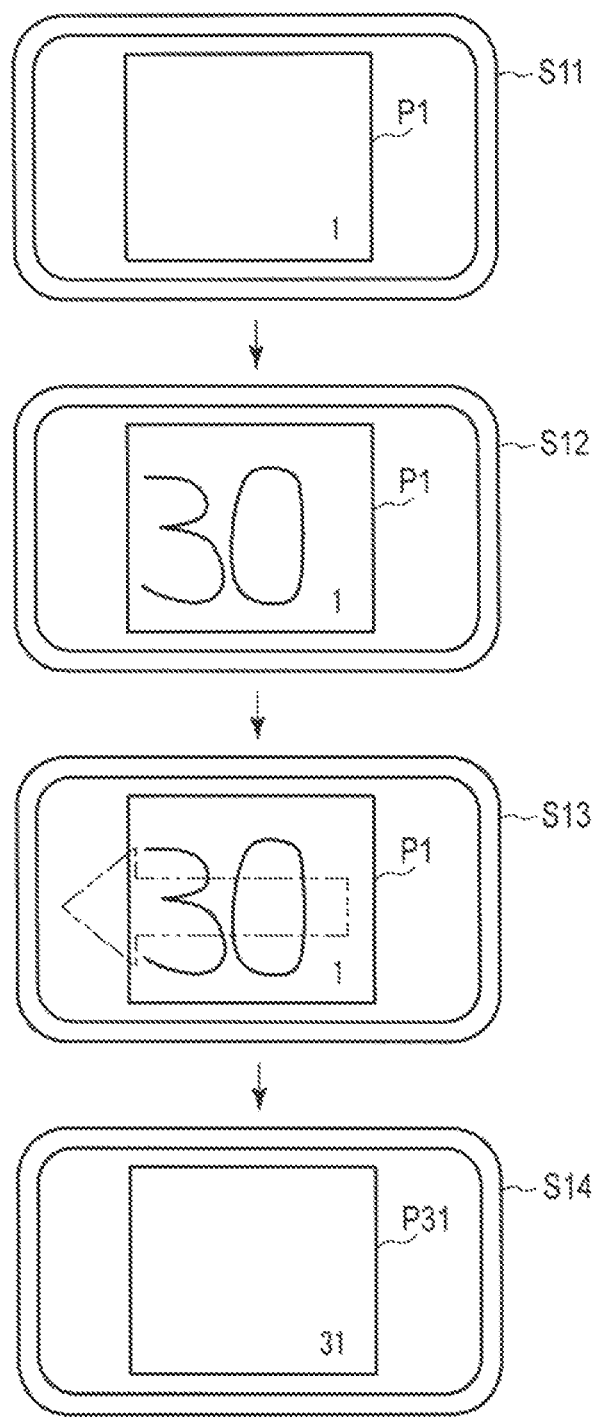
FIG. 5 schematically shows an example of screen transition of a touch panel according to the first embodiment.

In FIG. 5, a screen example S11 shows a state in which the value P of the page number counter is "1", that is, a content image P1 on the first page is displayed on the panel surface. In this state, the user inputs by handwriting a numerical value of the pages to be moved on the panel surface as the first operation. Here, the handwriting includes handwriting using a tool such as a stylus and finger writing. In FIG. 5, a screen example S12 shows a state in which the user inputs by handwriting "30" as a numerical value of the pages to be moved on the panel surface. Subsequently, the user swipes the panel surface as the second operation. In FIG. 5, a screen example S13 schematically shows a state in which the user swipes the panel surface where the user input by handwriting the numerical value "30" to the left by an arrow of a two-dot chain line. In this way, the user inputs by handwriting a numerical value as the first operation on the panel surface and then swiping the panel surface as the second operation, so that a content image P31 on page "31" obtained by adding a handwritten input numerical value "30 to page "1" before the movement is displayed on the panel surface as shown in a screen example S14 of FIG. 5.

In order to enable the first operation and the second operation as described above, the processor executes the processing after Act 5 in FIG. 3. That is, the processor 11, which displays the content image on the P-th page on the panel surface of the touch panel 16 in Act 5, checks whether or not the end button is operated in Act 6. If the end button is not operated (NO in Act 6), the processor 11 checks whether or not the first operation is performed on the panel surface in Act 7. If the first operation is not performed (NO in Act 7), the process returns to Act 6. Here, the processor 11 waits until the end button is operated or the first operation is performed by the processing of Act 6 and Act 7, respectively.

In the standby status of Act 6 and Act 7, when detecting that the end button is operated (YES in Act 6), the processor 11 erases the content image displayed on the panel surface in Act 8. Thus, the processor 11 ends the information processing according to the display control program.

To the contrary, in the standby status of Act 6 and Act 7, if it is detected that the first operation is performed on the panel surface (YES in Act 7), the process proceeds to Act 11 in FIG. 4. That is, the processor 11 checks whether or not the first operation is a handwriting input to the panel surface in Act 11. If the first operation is not a handwriting input to the panel surface (NO in Act 11), the process returns to Act 5 in FIG. 3. Then, the processor 11 repeats the processing after Act 5 in the same manner as described above.

If the first operation is a handwriting input to the panel surface (YES in Act 11), the processor 11 checks whether or not the handwritten input information is a numerical value in Act 12. Then, if the handwritten input information is not a numerical value (NO in Act 12), the process returns to Act 5 in FIG. 3. Then, the processor 11 repeats the processing after Act 5 in the same manner as described above.

If the handwritten input information is a numerical value (YES in Act 12), the processor 11 stores a numerical value N in the work area of the main memory 12 in Act 13. Subsequently, the processor 11 checks whether or not a handwriting input which is the first operation is continued in Act 14. Then, if handwriting input is continued (YES in Act 14), the processor 11 returns to Act 12. Then, the processor 11 repeats the processing after Act 12 in the same manner as described above. Accordingly, if the user inputs by handwriting, for example, a two-digit value, the numerical value is stored in the work area. In addition, if the user inputs by handwriting a character or the like other than a numerical value, the handwritten input becomes invalid. In the following description, a handwritten input numerical value is "N" regardless of the number of digits of the numerical value.

Here, the processor 11 configures the first input detection unit by executing the processing of Act 11 to Act 14. Then, the first input detection unit includes a numerical value recognition unit by the processing of Act 12.

When the first operation which is a handwriting input is ended (NO in Act 14), the processor 11 waits until the second operation to the panel surface is performed in Act 15. Then, when the second operation is performed (YES in Act 15), the processor 11 checks whether or not the second operation is a swipe to the left direction towards the panel surface in Act 16.

If the second operation is not a swipe to the left direction (NO in Act 16), the processor 11 checks whether or not the second operation is a swipe to the right direction towards the panel surface in Act 17. If the second operation is also not a swipe to the right direction (NO in Act 17), the processor 11 returns to Act 5 in FIG. 3. Then, the processor 11 repeats the processing after Act 5 in the same manner as described above. Accordingly, for example, even if the user inputs by handwriting a numerical value as the first operation, if an operation other than left and right swipes, such as a tap, a pinch out or pinch in, or up and down swipes, a so-called swipe up or swipe down is performed as the second operation, the handwritten input numerical value becomes invalid and the panel surface returns to the state in which the content image on the P-th page is displayed.

If the second operation is a swipe to the left direction (YES in Act 16), the processor 11 adds the numerical value N stored in the work area to the value P of the page number counter as Act 18. Then, the processor 11 checks whether or not the added value P+N is less than or equal to the number of pages M of the content file. Here, the content file is a content file selected from the content list in Act 2 and the number of pages M thereof is stored in the management table memory 132 in association with the file name of the content file.

If the added value P+N is less than or equal to the number of pages M (YES in Act 18), the processor 11 changes the value P of the page number counter to the added value P+N as Act 19. Thereafter, the process returns to Act 5 in FIG. 3. Then, the processor 11 repeats the processing after Act 5 in the same manner as described above.

Accordingly, among the content images stored in the work area, the content image of which page number is the added value P+N is developed in the display buffer and displayed on the panel surface of the touch panel 16. As shown in FIG. 5, in the state of the screen example S11 in which the content image P1 on the first page is displayed on the panel surface, when the user swipes the panel surface to the left direction after handwriting and inputting a numerical value "30", the state of the screen example S14, that is, the content image P31 on the 31 st page is displayed on the panel surface.

If the added value P+N exceeds the number of pages M (NO in Act 18), the content image is not changed. In this case, the process returns to Act 5 in FIG. 3 without executing the processing of Act 19. Then, the processor 11 repeats the processing after Act 5 in the same manner as described above. Accordingly, the content image displayed on the panel surface does not change.

On the other hand, if the second operation is a swipe to the right direction (YES in Act 17), the processor 11 subtracts the numerical value N stored in the work area from the value P of the page number counter as Act 20. Then, the processor 11 checks whether or not the subtracted value P−N is "1" or more. If the subtracted value P−N is greater than or equal to "1" (YES in Act 20), the processor 11 changes the value P of the page number counter to the subtracted value P−N as Act 21. Thereafter, the processor 11 returns to Act 5 in FIG. 3. Then, the processor 11 repeats the processing after Act 5 in the same manner as described above.

Accordingly, among the content images stored in the work area, the content image of which page number is the subtracted value P−N is developed in the display buffer and displayed on the panel surface of the touch panel 16. In the state in which the screen example S14 of FIG. 5 is displayed, for example, when the user swipes the panel surface to the right direction after handwriting and inputting a numerical value "20", a content image P11 on the 11th (=31−20) th page is displayed on the panel surface.

If the subtracted value P−N is less than "1", that is, if the subtracted value is zero or negative (NO in Act 20), the content image is not changed. In this case, the process returns to Act 5 in FIG. 3 without executing the processing of Act 21. Then, the processor 11 repeats the processing after Act 5 in the same manner as described above. Accordingly, the content image displayed on the panel surface does not change.

Here, the processor 11 configures the second input detection unit by executing the processing of Act 16 to Act 17. In addition, the processor 11 configures a second determination unit by executing the processing of Act 18 and Act 20 and configures a first determination unit by executing the processing of Act 19 and Act 21. Further, the processor 11 configures the display control unit by executing the process of Act 5.

In this way, for example, when the user wants to check the content image P31 on the 31st page in a state in which the content image P1 on the first page is displayed on the panel surface, in the related art, when it is assumed that one page is moved with one swipe, at least 30 swipes were necessary. To the contrary, according to the first embodiment, since it is only necessary to input by handwriting the number of pages "30" to be moved and then swipe to the left once, the operation is simple. In addition, the time required to obtain the content image on a desired page is also shorter compared to the related art. Accordingly, it is possible to display a desired content image among many content images with a simple operation in a short time.

In addition, according to the first embodiment, if the handwritten input number of pages is too large, the handwriting input becomes invalid. Even if the user inputs by handwriting an incorrect number, the user can easily start over. For example, in the screen example of FIG. 5, by displaying the number of pages M of the content images displayed on the panel surface on a part of the screen, it is possible to reduce erroneous handwriting input.

Second Embodiment

Next, a second embodiment will be described with reference to FIGS. 6 to 8.

The difference between the first embodiment and the second embodiment is a part of the processing after detecting that the first operation is performed on the panel surface in Act 7 of the display control process executed by the processor 11 in accordance with the display control program. Therefore, FIGS. 1 to 3 are referred to without changes in the second embodiment and the description thereof will be omitted.

Figure 6:
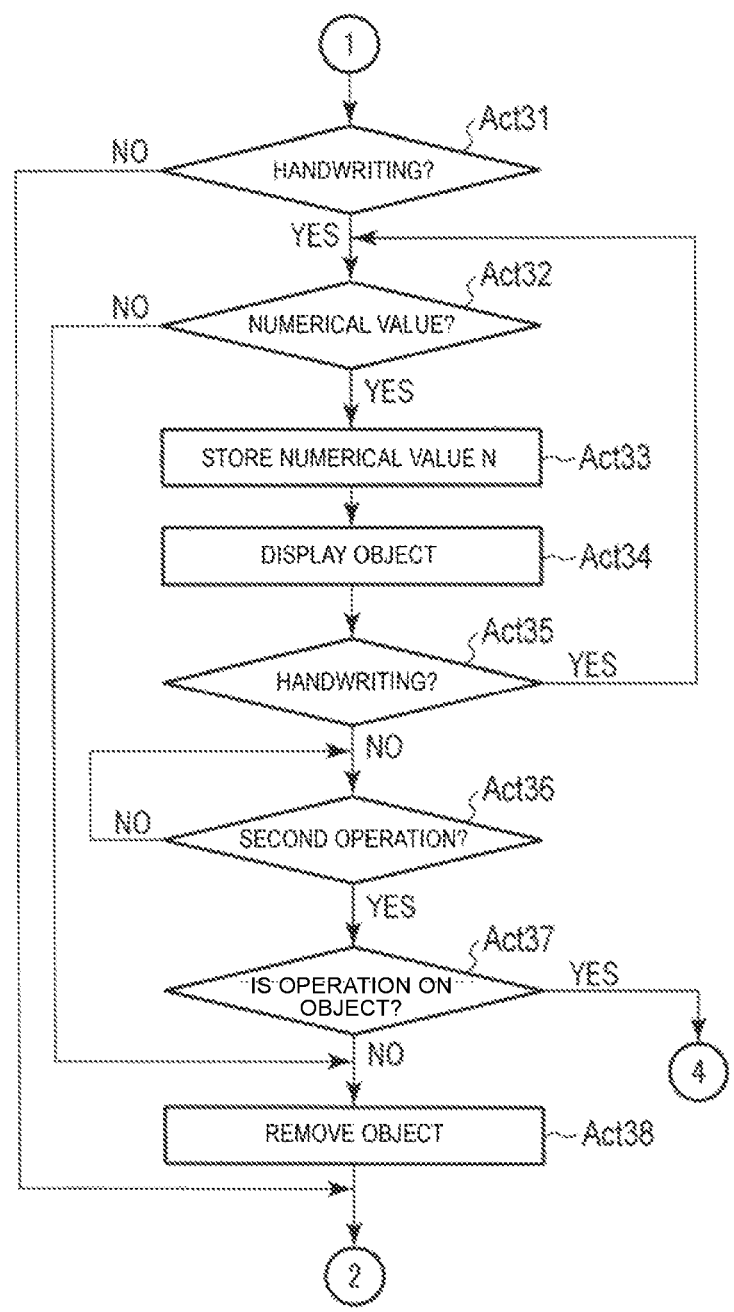
FIGS. 6 and 7 are each a flowchart showing a procedure of information processing executed by a processor according to a second embodiment.
Figure 7:
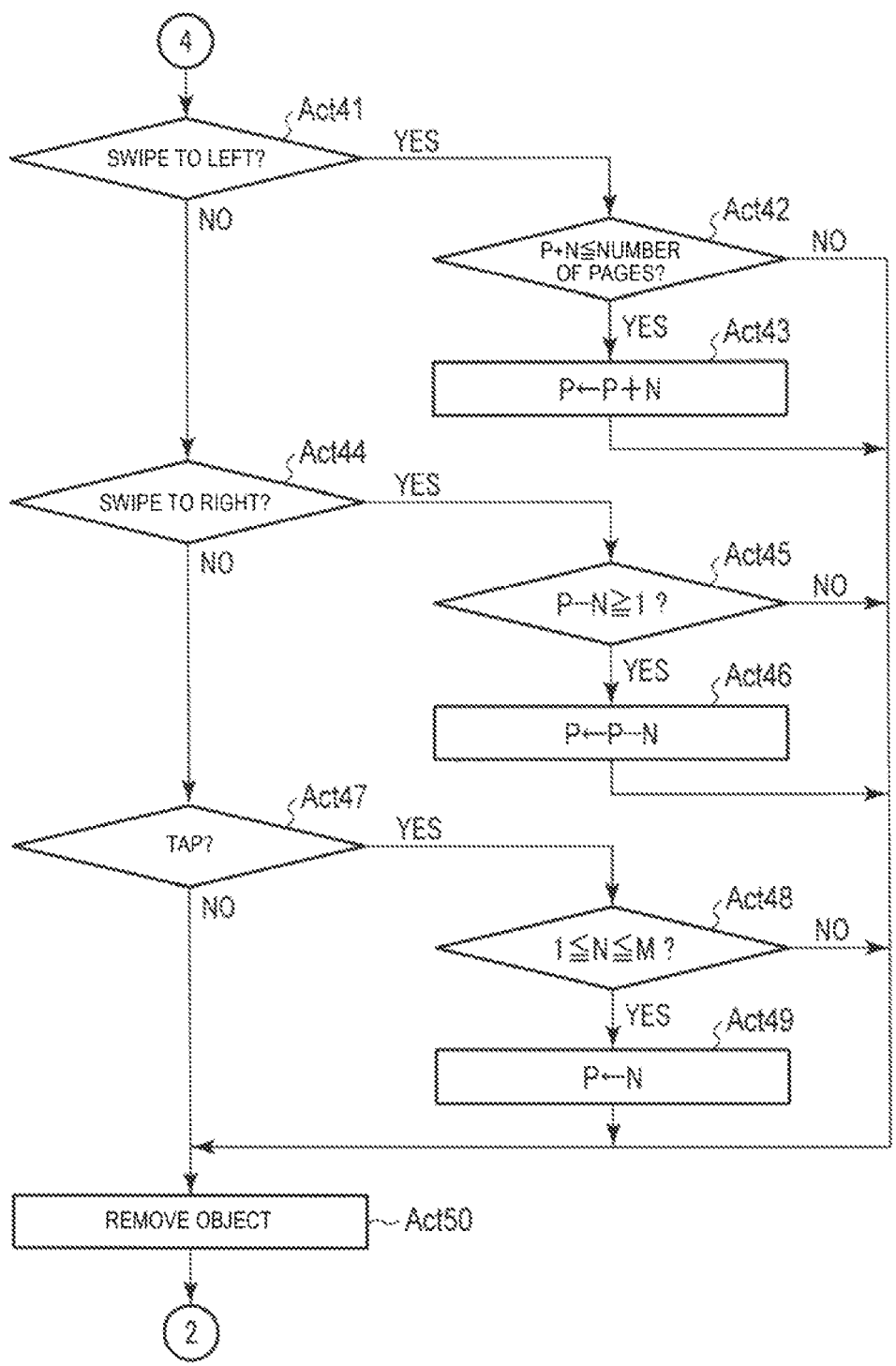

FIGS. 6 and 7 are flowcharts showing the processing procedure of the processor 11 after detecting that the first operation is performed on the panel surface in Act 7. In addition, FIG. 8 is a screen example of the panel surface of the touch panel 16 in the second embodiment. The contents of the processing shown in FIGS. 6 and 7, and the processing described below are merely examples. As long as similar results can be obtained, the processing procedure and processing contents are not particularly limited.

If it is detected that the first operation is performed on the panel surface (YES in Act 7), the process proceeds to Act 31 in FIG. 6. That is, the processor 11 checks whether or not the first operation is a handwriting input to the panel surface in Act 31. If the first operation is not handwriting input to the panel surface (NO in Act 31), the process returns to Act 5 in FIG. 3. Then, the processor 11 repeats the processing after Act 5 in the same manner as described above.

If the first operation is a handwriting input to the panel surface (YES in Act 31), the processor 11 checks whether or not the handwritten input information is a numerical value in Act 32. Then, if the information input by handwriting is not a numerical value (NO in Act 32), the process returns to Act 5 in FIG. 3. Then, the processor 11 repeats the processing after Act 5 in the same manner as described above.

If the handwritten input information is a numerical value (YES in Act 32), the processor 11 stores a numerical value N in the work area of the main memory 12 in Act 33. In addition, the processor 11 creates an object containing the numerical value in Act 34 and displays the object on the panel surface.

Here, a specific example of the object will be described with reference to FIG. 8. A screen example S21 in FIG. 8 shows a state in which the value P of the page number counter is "31", that is, the content image P31 on the 31st page is displayed on the panel surface. In this state, as shown in a screen example S22, when the user inputs by handwriting a numerical value "2", as shown in the screen example S23, an object J1 containing the handwritten input numerical value "2" is displayed above the content image P31. In this way, the object is a shape that encloses the handwritten input numerical value. The shape is not limited to a circular shape as shown in the drawing. The shape may be a triangle, a square, a pentagon, a hexagon, or the like.

Referring back to FIG. 6, the processor 11, which displays the object, checks whether or not a handwriting input which is the first operation is continued in Act 35. Then, if handwriting input is continued (YES in Act 35), the process returns to Act 32. Then, the processor 11 repeats the processing after Act 32 in the same manner as described above.

Accordingly, if the user inputs by handwriting a second numerical value, the numerical value is stored in the work area, and an object containing a two-digit value is displayed on the panel surface. For example, when the user inputs by handwriting a second numerical value "0" as shown in a screen example S24 in a state in which a screen example S23 of FIG. 8 is displayed, an object J2 containing a handwritten input two-digit value "20" is displayed above the content image P31 as shown in the screen example S25. In the following description, a handwritten input numerical value is "N" regardless of the number of digits of the numerical value.

When a handwriting input is ended (NO in Act 35), the processor 11 waits until the second operation to the panel surface is performed in Act 36. Then, when the second operation is performed, the processor 11 checks whether or not the second operation is carried out on the object displayed on the panel surface as Act 37. That is, it is checked whether a finger or the like is first touched within the shape of the object displayed on the panel surface. If the second operation is not carried out on the object (NO in Act 37), the processor 11 erases the object in Act 38. Then, the process returns to Act 5 in FIG. 3. Then, the processor 11 repeats the processing after Act 5 in the same manner as described above.

If the second operation is carried out on the object (YES in Act 37), the process proceeds to Act 41 in FIG. 7. That is, the processor 11 checks whether or not the second operation is a swipe to the left direction towards the panel surface in Act 41. Here, when the second operation is a swipe to the left direction (YES in Act 42), the processor 11 executes the same processing as Act 18 and Act 19 of the first embodiment in Act 42 and Act 43. Thereafter, the process proceeds to Act 50.

If the second operation is not a swipe to the left direction (NO in Act 41), the processor 11 checks whether or not the second operation is a swipe to the right direction towards the panel surface in Act 44. Here, when the second operation is a swipe to the right direction (YES in Act 44), the processor 11 executes the same processing as Act 20 and Act 21 of the first embodiment in Act 45 and Act 46. Thereafter, the process proceeds to Act 50.

If the second operation is also not a swipe to the right direction (NO in Act 44), the processor 11 checks whether or not the second operation is a tap operation in Act 47. Here, if the second operation is a tap operation (YES in Act 47), the processor 11 checks whether or not the numerical value N stored in the work area is within the range from "1" to the number of pages M of the content file in Act 48. Here, the content file is a content file selected from the content list in Act 2 and the number of pages M thereof is stored in the management table memory 132 in association with the file name of the content file.

If the numerical value N is within the range from "1" to the number of pages M (YES in Act 48), the processor 11 changes the value P of the page number counter to the numerical value N in Act 49. Thereafter, the process proceeds to Act 50.

If the second operation is not a tap operation (NO in Act 47), the process proceeds to Act 50. In Act 50, the processor 11 erases the object displayed on the panel surface. Thereafter, the process returns to Act 5 in FIG. 3. Then, the processor 11 repeats the processing after Act 5 in the same manner as described above.

Figure 8:
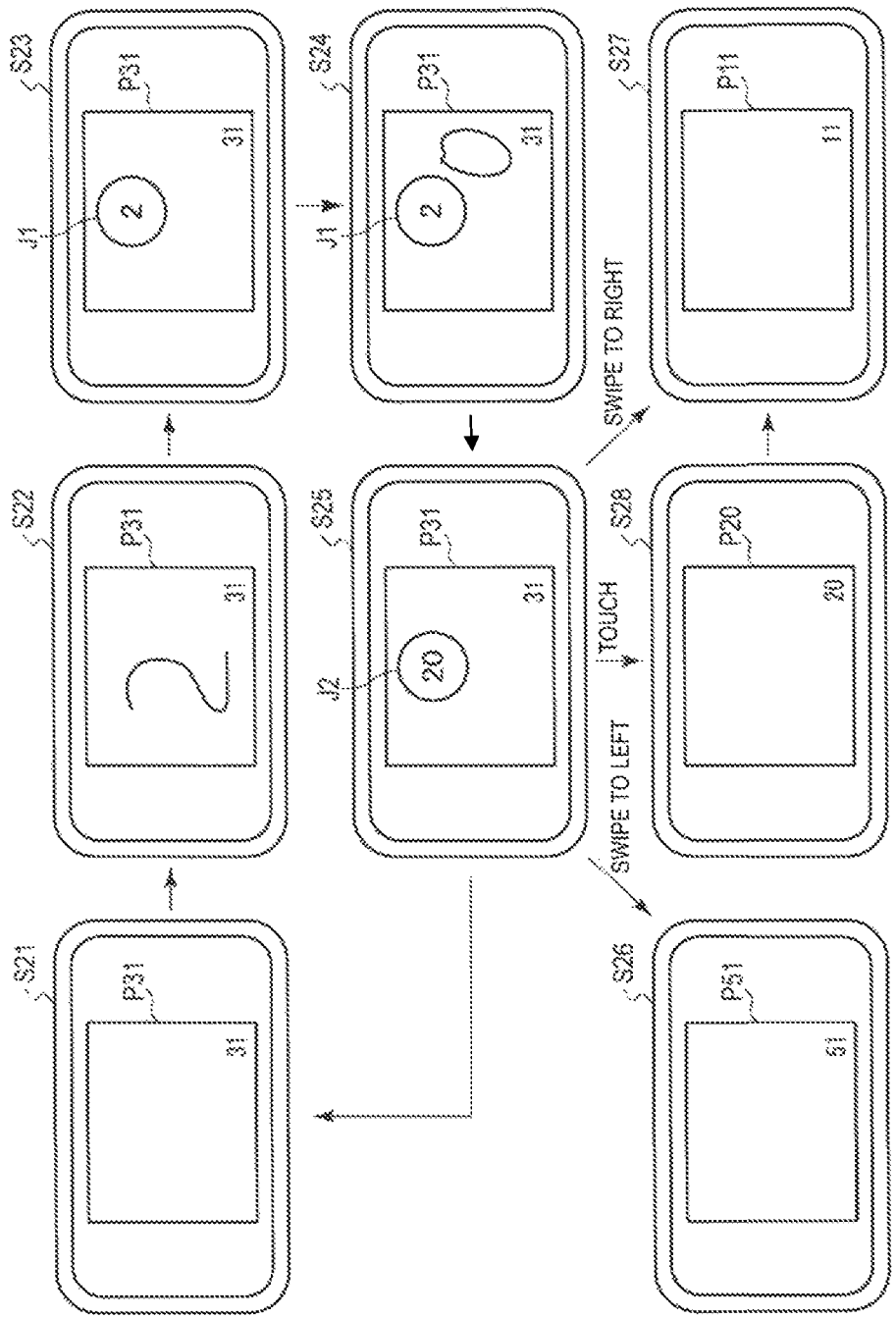
FIG. 8 schematically shows an example of screen transition of a touch panel according to the second embodiment.

Accordingly, for example, when the user swipes the panel surface to the left direction from above the object J2 in a state in which the screen example S25 of FIG. 8 is displayed, a content image P51 on the 51st page corresponding to a value 51 obtained by adding the handwritten input numerical value N=20 to the value P of the page number counter=31 is displayed on the panel surface as shown in a screen example S26. Similarly, if the user swipes the panel surface from above the object J2 to the right direction, the content image P11 on the 11th page corresponding to a value 11 obtained by subtracting the handwritten input numerical value N=20 from the value P of the page number counter=31 is displayed on the panel surface as shown in a screen example S27. In addition, if the user taps on the object J2, the content image P20 of the 20th page corresponding to the handwritten input numerical value N=20 is displayed on the panel surface as shown in the screen example S28.

Even if the user carries out the second operation on the object, if the user performs an operation other than left and right swipes or an operation other than a tap, the numerical value handwritten and input becomes invalid and the panel surface returns to a state in which the content image on the 31st page is displayed as shown in the screen example 21.

Here, the processor 11 configures the first input detection unit by executing the processing of Act 31 to Act 35 and configures the second input detection unit by executing the processing of Act 41, Act 44, and Act 47. In addition, the processor 11 configures the second determination unit by executing the processing of Act 42, Act 45, and Act 48 and configures the first determination unit by executing the processing of Act 43, Act 46, and Act 49. Further, the processor 11 configures the display control unit by executing the process of Act 5.

According to the second embodiment, similarly to the first embodiment, it is possible to display a desired content image among many content images with a simple operation in a short time. In addition, according to the second embodiment, since it is also possible to input by handwriting the page number of a destination itself, operability is simpler.

Third Embodiment

Next, the third embodiment will be described with reference to FIGS. 9 and 10.

The difference between the first embodiment and the third embodiment is a part of the processing after detecting that the first operation is performed on the panel surface in Act 7 of the display control processing executed by the processor 11 according to the display control program. Therefore, FIGS. 1 to 3 are referred to without changes in the third embodiment and the description thereof will be omitted.

Figure 9:
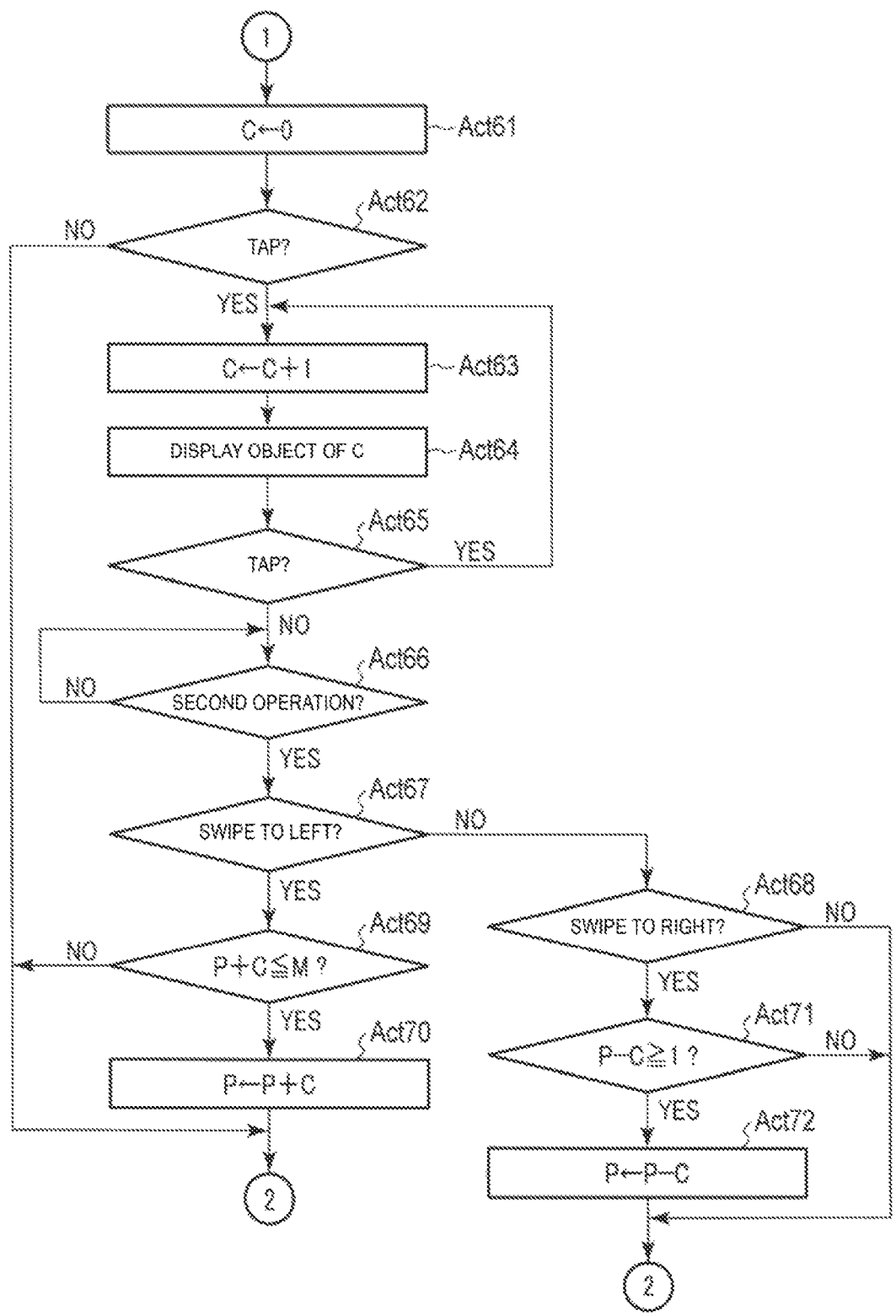
FIG. 9 is a flowchart showing a procedure of information processing executed by a processor according to a third embodiment.
Figure 10:
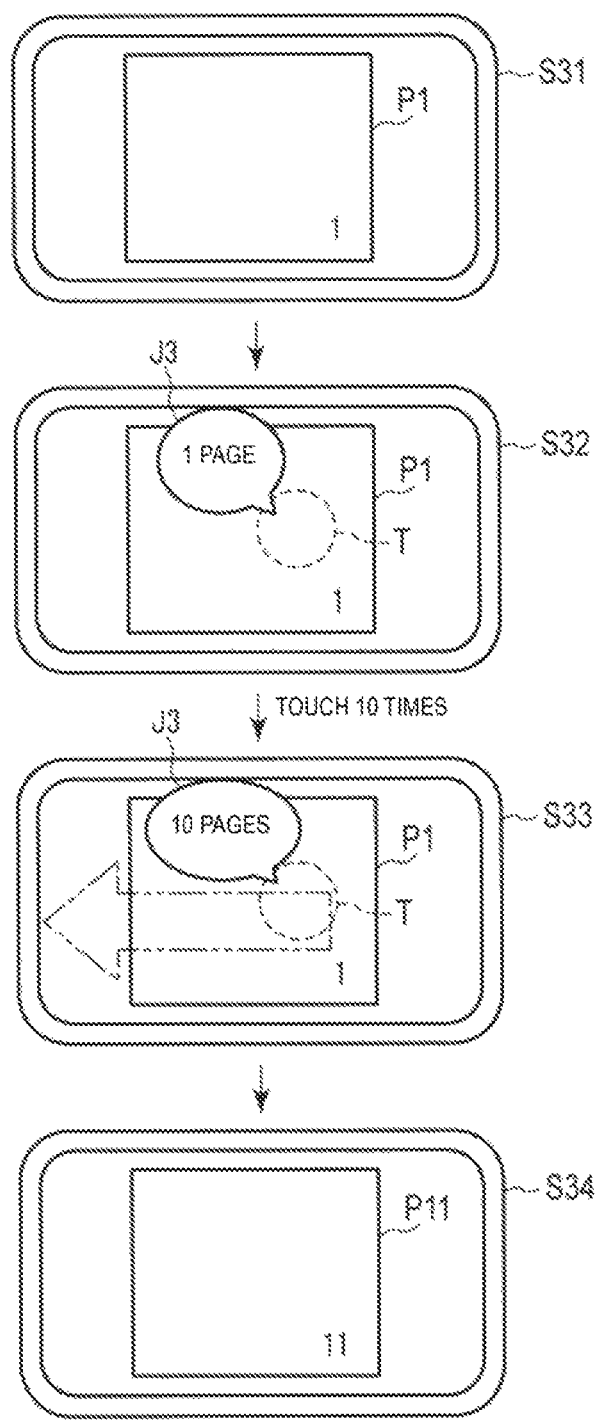
FIG. 10 schematically shows an example of screen transition of a touch panel according to the third embodiment.

FIG. 9 is a flowchart showing the processing procedure of the processor 11 after detecting that the first operation is performed on the panel surface in Act 7. In addition, FIG. 10 is a screen example of the panel surface of the touch panel 16 in the third embodiment. The contents of the processing shown in FIG. 9, and the processing described below are merely examples. As long as similar results can be obtained, the processing procedure and processing contents are not particularly limited.

If it is detected that the first operation is performed on the panel surface (YES in Act 7), the process proceeds to Act 61 in FIG. 9. That is, the processor 11 initializes a value C of a repetition counter to "0" in Act 61. Subsequently, the processor 11 checks whether or not the first operation is a tap to the panel surface in Act 62. If the first operation is not a tap to the panel surface (NO in Act 62), the process returns to Act 5 in FIG. 3. Then, the processor 11 repeats the processing after Act 5 in the same manner as described above.

If the first operation is a tap to the panel surface (YES in Act 62), the processor 11 counts up the value C of the repetition counter by "1" as Act 63. Then, the processor 11 creates an object with the value C as the number of pages and displays the object on the panel surface in Act 64.

Here, a specific example of the object will be described with reference to FIG. 10. A screen example S31 in FIG. 10 shows a state in which the value P of the page number counter is "1", that is, the content image P1 on the first page is displayed on the panel surface. In this state, if the user taps the panel surface once, an object J3 with the value C as the page number is displayed on the content image P1 as shown in a screen example S32. In the screen example S22, an image indicated by a symbol T indicates a tap position. A tap position T may be displayed as a part of the object J3 or may not be displayed.

Referring back to FIG. 9, the processor 11, which displays the object, checks whether or not a tap is continued in Act 65. Then, if the tap is continued (YES in Act 65), the process returns to Act 63. Then, the processor 11 repeats the processing after Act 63 in the same manner as described above.

Accordingly, if the user taps the panel surface more than twice, the object J3 of which page number is the value C that matches the repetitions is repeatedly displayed on the content image P1. For example, a screen example S33 in FIG. 10 is an example including the object J3 when the user taps 10 times.

When a tap is ended (NO in Act 65), the processor 11 waits until the second operation to the panel surface is performed in Act 66. Then, when the second operation is performed (YES in Act 66), the processor 11 checks whether or not the second operation is a swipe to the left direction towards the panel surface in Act 67.

If the second operation is not a swipe to the left direction (NO in Act 67), the processor 11 checks whether or not the second operation is a swipe to the right direction towards the panel surface in Act 68. If the second operation is also not a swipe to the right (NO in Act 68), the processor 11 returns to Act 5 in FIG. 3. Then, the processor 11 repeats the processing after Act 5 in the same manner as described above. Accordingly, for example, even if a tap is performed as the first operation, if an operation other than left and right swipes, such as a pinch out or pinch in operation, or up and down swipes, a so-called swipe up or swipe down operation is performed as the second operation, the value C of the tapped number becomes invalid and the panel surface returns to the state in which the content image on the P-th page is displayed.

To the contrary, if the second operation is a swipe to the left direction (YES in Act 67), the processor 11 adds the value C of the repetition counter to the value P of the page number counter in Act 69. Then, the processor 11 checks whether or not the added value P+C is less than or equal to the number of pages M of the content file. If the added value P+C is less than or equal to the number of pages M (YES in Act 69), the processor 11 changes the value P of the page number counter to the added value P+C in Act 70. Thereafter, the process returns to Act 5 in FIG. 3. Then, the processor 11 repeats the processing after Act 5 in the same manner as described above.

Accordingly, among the content images stored in the work area, the content images of which page number is the added value P+C is developed in the display buffer and displayed on the panel surface of the touch panel 16. As shown in FIG. 10, in the state of the screen example S31 in which the content image P1 on the first page is displayed on the panel surface, when the user swipes the panel surface to the left direction after tapping 10 times as the first operation, the state of the screen example S34, that is, the content image P11 on the 11th page is displayed on the panel surface.

If the added value P+C exceeds the number of pages M (NO in Act 69), the content image is not changed. In this case, the process returns to Act 5 in FIG. 3 without executing the processing of Act 70. Then, the processor 11 repeats the processing after Act 5 in the same manner as described above. Accordingly, the content image displayed on the panel surface does not change.

On the other hand, if the second operation is a swipe to the right direction (YES in Act 68), the processor 11 subtracts the value C of the repetition counter from the value P of the page number counter in Act 71. Then, the processor 11 checks whether or not the subtracted value P−C is "1" or more. If the subtracted value P−C is greater than or equal to "1" (YES in Act 71), the processor 11 changes the value P of the page number counter to the subtracted value P−C in Act 72. Thereafter, the process returns to Act 5 in FIG. 3.

Then, the processor 11 repeats the processing after Act 5 in the same manner as described above.

Accordingly, among the content images stored in the work area, the content images of which page number is the subtracted value P−C is developed in the display buffer and displayed on the panel surface of the touch panel 16. In the state in which the screen example S35 of FIG. 10 is displayed, for example, when the user swipes the panel surface to the right direction after tapping three times as the first operation, a content image P8 on the 8th (=11−3) page is displayed on the panel surface.

If the numerical value P−C is less than "1", that is, if the subtracted value is zero or negative (NO in Act 71), the content image is not changed. In this case, the process returns to Act 5 in FIG. 3 without the processing of Act 72. Then, the processor 11 repeats the processing after Act 5 in the same manner as described above. Accordingly, the content image displayed on the panel surface does not change.

Here, the processor 11 configures the first input detection unit by executing the processing of Act 62 to Act 65 and configures the second input detection unit by executing the processing of Act 67 and Act 68. In addition, the processor 11 configures the second determination unit by executing the processes of Act 69 and Act 71 and configures the first determination unit by executing the processes of Act 70 and Act 72. Further, the processor 11 configures the display control unit by executing the process of Act 5.

According to the third embodiment, similarly to the first and the second embodiments, it is possible to display a desired content image among many content images with a simple operation in a short time. In addition, according to the third embodiment, since the user does not input by handwriting the number of pages to be moved but simply taps as many times as the number of pages, operability is simpler.

In the third embodiment, the repetition counter C is counted up by "1" by one tap, but the value to be counted up may be set to "2" or more. By setting the value to be counted up to "2" or more, since the number of pages to be moved is larger than the repetitions of a tap, an object with a desired number as the page number can be obtained more easily and in a short time.

Fourth Embodiment

Next, a fourth embodiment will be described with reference to FIG. 11.

The difference between the third embodiment and the fourth embodiment is the contents of the first operation. In the third embodiment, the repetitions of a tap are counted by the repetition counter as the contents of the first operation. In the fourth embodiment, the time of a long tap (long press, or tap and hold) is counted by a seconds counter.

Figure 11:
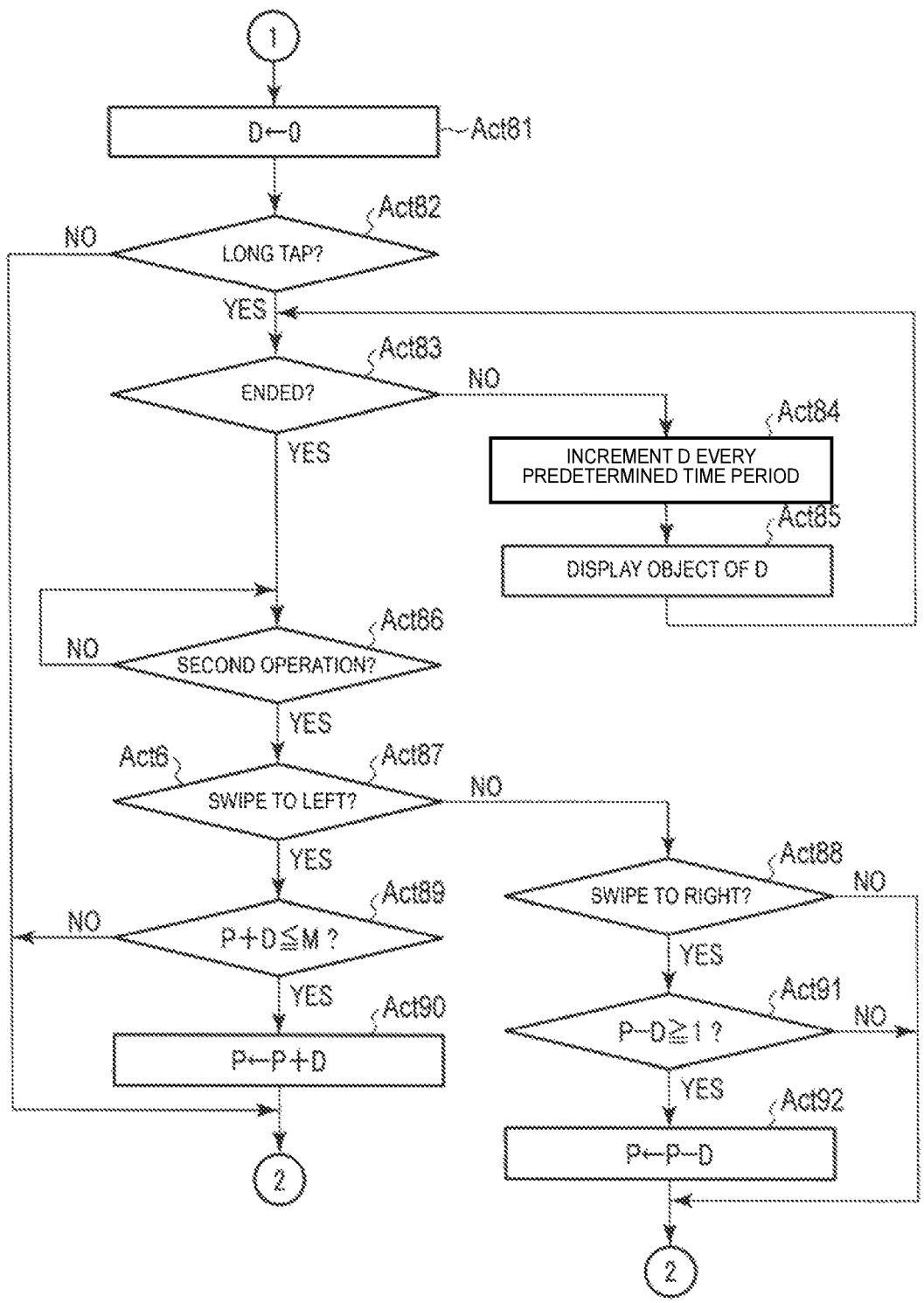
FIG. 11 is a flowchart showing a procedure of information processing executed by a processor according to a fourth embodiment.

FIG. 11 is a flowchart showing the processing procedure of the processor 11 after detecting that the first operation is performed on the panel surface in Act 7 of the display control processing executed by the processor 11 according to the display control program. The contents of the processing shown in FIG. 11 and the processing described below are merely examples. As long as similar results can be obtained, the processing procedure and processing contents are not particularly limited.

If it is detected that the first operation is performed on the panel surface (YES in Act 7), the process proceeds to Act 81 in FIG. 11. That is, the processor 11 initializes a value D of the seconds counter to "0" in Act 81. Subsequently, the processor 11 checks whether or not the first operation is a long tap to the panel surface in Act 82. If the first operation is not a long tap to the panel surface (NO in Act 82), the process returns to Act 5 in FIG. 3. Then, the processor 11 repeats the processing after Act 5 in the same manner as described above.

If the first operation is a long tap to the panel surface (YES in Act 82), the processor 11 checks whether or not the long tap is ended in Act 83. If the long tap is not ended (NO in Act 83), the processor 11 counts up the value D of the seconds counter by "1" each time a predetermined time period (e.g., one second) elapses in Act 84. In addition, the processor 11 creates an object with the value D as the number of pages each time the predetermined time period elapses and displays the object on the panel surface in Act 85. The object in this case may be the same as the object J3 of the third embodiment.

When a long tap is ended (YES in Act 83), the processor 11 waits until the second operation to the panel surface is performed in Act 86. Then, the second operation is performed (YES in Act 86), the processor 11 executes the processing of Act 87 to Act 92. The processing of Act 87 to Act 92 is common to the processing of Act 67 to Act 72 in the third embodiment except for the value of the counter being D instead of C. Accordingly, the description thereof will be omitted.

Here, the processor 11 configures the first input detection unit by executing the processing of Act 82 and Act 83 and configures the second input detection unit by executing the processing of Act 87 and Act 88. In addition, the processor 11 configures the second determination unit by executing the processing of Act 89 and Act 91 and configures the first determination unit by executing the processing of Act 90 and Act 92. Further, the processor 11 configures the display control unit by executing the process of Act 5.

According to the fourth embodiment, similarly to the first to the third embodiments, it is possible to display a desired content image among many content images with a simple operation in a short time. In addition, according to the fourth embodiment, since a long tap only needs to be continued as the first operation until the numerical value of the object J3 becomes the number of pages to be moved, operability is simpler.

In the fourth embodiment, the numerical value of the object J3 is increased by counting the time of the long tap, but the unit configured to increase the numerical value of the object J3 is not limited thereto. For example, a unit configured to detect the pressure of a long tap on the panel surface is provided on the touch panel. Then, it is also possible to increase the value of the object J3 by the strength of the pressure of the long tap.

Hereinafter, a modification example of the above embodiments will be described.

In the above embodiments, one content image is displayed on the panel surface of the touch panel 16. In the modification example, a plurality of content images is displayed on the panel surface.

Figure 12:
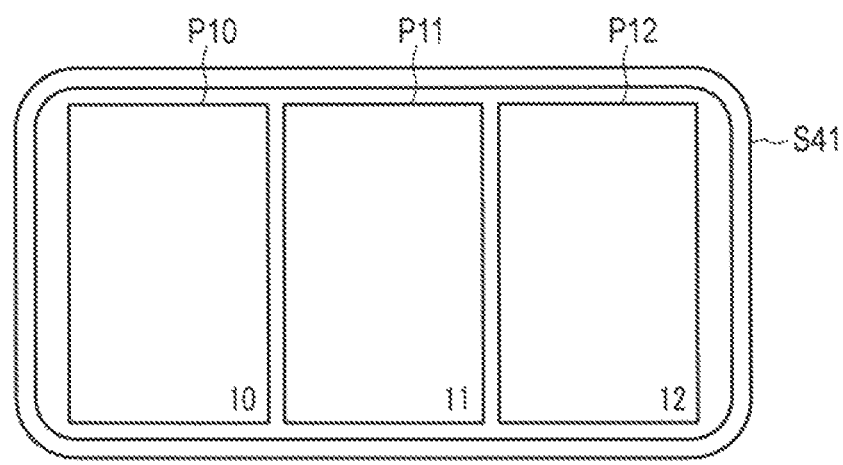
FIG. 12 schematically shows a modification example of a touch panel displaying a content image.
Figure 13:
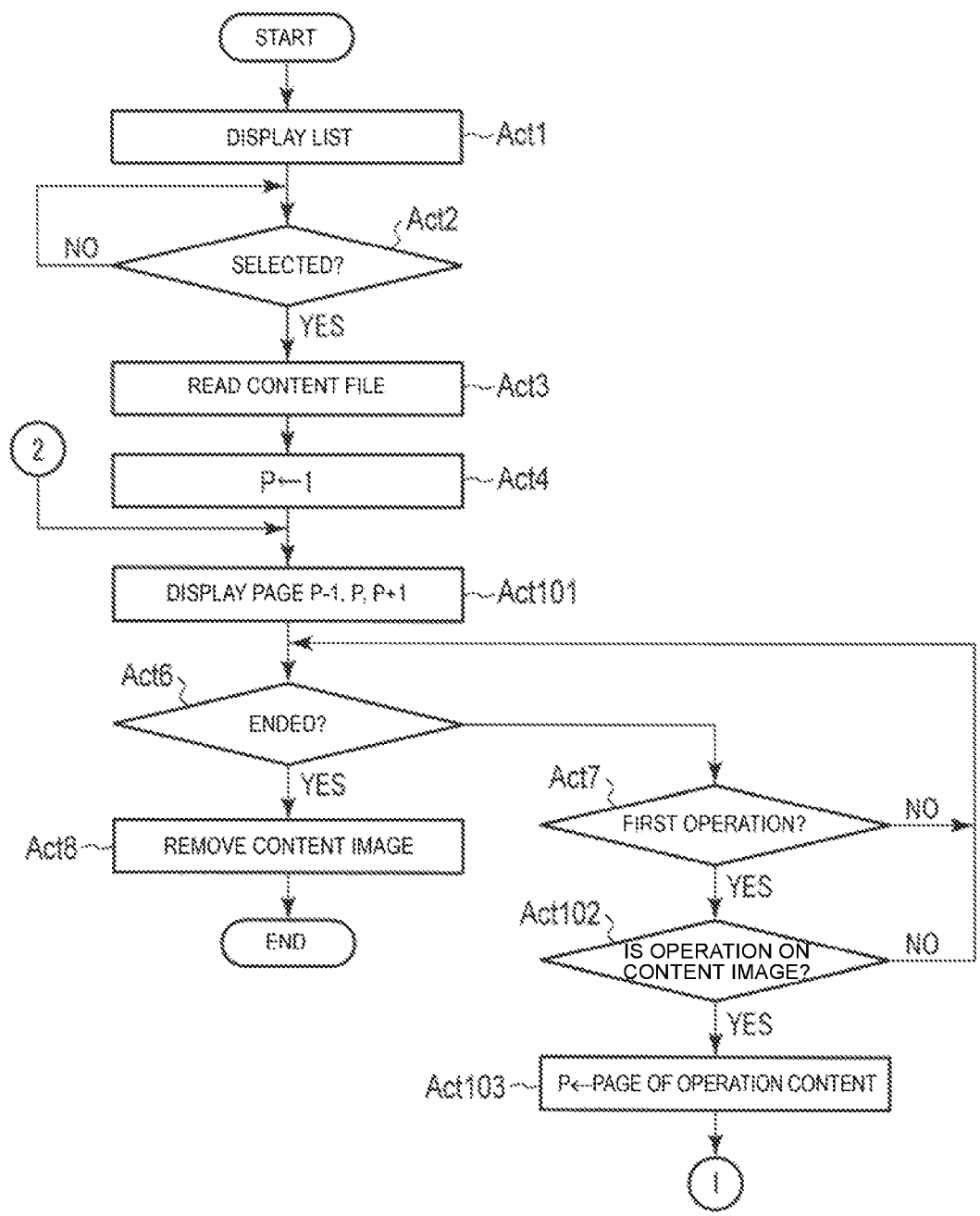
FIG. 13 is a flowchart showing a procedure of information processing executed by a processor according to the modification example of FIG. 12.

FIG. 12 shows a screen example S41 on which three content images P10, P11, and P12 are displayed on the panel surface. In this case, by changing the processing of Act 1 to Act 7 of the display control processing executed by the processor 11 according to the display control program shown in FIG. 3 to the processing of Act 1 to Act 103 shown in FIG. 13, each embodiment can be implemented.

That is, in the state in which the content list is displayed on the touch panel 16 in Act 1, the processor 11 waits for a content file to be selected in Act 2. Then, upon checking that one content file is selected (YES in Act 2), the processor 11 reads the selected content file from the content file memory 131 in Act 3 and stores the content images stored in the content file in the work area of the main memory 12. In addition, the processor 11 initializes a value P of a page number counter to "1" in Act 4. Then, the processor 11 develops the content image of which page number matches the value P of the page number counter, the content image of which page number matches a value P−1 which is one less than the value P, and the content image of which page number matches a value P+1 which is one larger than the value P among the content images stored in the work area in the display buffer, respectively and displays the images on the panel surface of the touch panel 16 in Act 101. At this time, the processor 11 displays the content image of which page number matches the value P in the center, the content image of which page number matches the value P−1 on the left side towards the panel surface, and the content image of which page number matches the value P+1 on the right side towards the panel surface. When the value P is 1, images of page numbers 1, 2, 3 are displayed instead.

Thereafter, the processor 11 checks whether or not the end button is operated in Act 6. If the end button is not operated (NO in Act 6), the processor 11 checks whether or not the first operation is performed on the panel surface in Act 7. If the first operation is not performed (NO in Act 7), the process returns to Act 6. Here, the processor 11 waits until the end button is operated or the first operation is performed by the processing of Act 6 and Act 7.

In the standby status of Act 6 and Act 7, when detecting that the end button is operated (YES in Act 6), the processor 11 erases the content image displayed on the panel surface in Act 8. Thus, the processor 11 ends the information processing according to the display control program.

To the contrary, if it is detected that the first operation is performed on the panel surface in the standby status of Act 6 and Act 7 (YES in ACT 7), the processor 11 checks whether or not the first operation is carried out on any of the content images displayed on the panel surface in Act 102. That is, it is checked whether or not a finger or the like is first touched within any of the content images displayed on the panel surface. If the first operation is not carried out on the content image (NO in Act 102), the process returns to Act 5. Then, the processor 11 repeats the processing after Act 5 in the same manner as described above.

If the first operation starts from above any of the content images (YES in Act 102), the processor 11 replaces the page number of the content image of which first operation started with the value P of the page number counter. For example, the screen example S41 of FIG. 12 is a case where the value P of the page number counter is 11, but in this example, when the first operation is carried out on the content image P10 on the left side, the value P of the page number counter is replaced with 10. Similarly, if the first operation is carried out on the content image P12 on the right side, the value P of the page number counter is replaced with 12. If the first operation is carried out on the content image P12 in the center, the value P of the page number counter remains unchanged.

When the processing of Act 103 is ended, the process proceeds to Act 11 of FIG. 4 in the first embodiment. Similarly, in the second embodiment, the process proceeds to Act 31 in FIG. 6, in the third embodiment, the process proceeds to Act 61 in FIG. 9, and in the fourth embodiment, the process proceeds to Act 81 in FIG. 11.

In addition, in the above embodiments, a multifunction peripheral is exemplified as a device implementing a display control device, but the device is not limited to the multifunction peripheral. The device may be any device capable of displaying a content image, such as a tablet terminal, a smartphone, or the like. In relation thereto, in the above embodiments, an image scanned by the scanner function or an image received by the facsimile function is defined as a content image, but the content image is not limited thereto. For example, an image on each page of an electronic book that can be viewed with a smartphone or the like is also an example of the content image.

In addition, in the above embodiments, the display control program is stored in the main memory 12 or the auxiliary storage device 13 in order to perform the function as the display control device. However, the present invention is not limited thereto. The display control program may not be stored in the main memory 12 or the auxiliary storage device 13. Then, in this case, the display control program or the like individually assigned from the multifunction peripheral 1 may be written to a writable storage device of the multifunction peripheral 1 according to the operation of the user or the like. The assignment of the display control program can be performed by recording on a removable recording medium or by communication via a network. The recording medium may be in any form as long as the medium can store a program such as a CD-ROM, a memory card, and the like and is readable by a device. In addition, the function obtained by installing or downloading a program may be one which realizes a function in cooperation with an OS (operating system) or the like inside the device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing among the spirit of the inventions. The accompanying claims and their equivalents are intended to cover such forms or modifications as would fall within the scope and spirit of the inventions.

What is claimed is:

1. A method for displaying an image selected from a plurality of images on a touch screen, comprising:
    displaying, on the touch screen, at least one image among the plurality of images, each of the plurality of images being associated with different one of consecutive image identification numbers;
    upon detecting a writing operation of a numerical value that is performed by a user on the touch screen while said at least one image is displayed, storing the numerical value in a memory;
    when a first swipe operation in a first direction on the touch screen is detected after the writing operation, displaying, on the touch screen, one of the plurality of images associated with an image identification number that is equal to an image identification number of said at least one image plus the stored numerical value; and
    when a second swipe operation in a second direction opposite to the first direction on the touch screen is detected after the writing operation, displaying, on the touch screen, one of the plurality of images associated with an image identification number that is equal to the image identification number of said at least one image minus the stored numerical value.

2. The method according to claim 1, wherein
    said displaying upon detecting the first swipe operation is carried out upon determining that a largest image identification number of the plurality of images is equal to greater than the image identification number of said at least one image plus the stored numerical value, and
    said displaying upon detecting the second swipe operation is carried out upon determining that a smallest image identification number of the plurality of images is equal to or less than the image identification number of said at least one image minus the stored numerical value.

3. The method according to claim 1, further comprising:
    upon detecting the writing operation of the numerical value, displaying, on the touch screen, an object indicating the numerical value.

4. The method according to claim 3, wherein each of the first and second swipe operations comprises swiping of the object.

5. The method according to claim 3, further comprising:
    displaying, on the touch screen, a trace of writing during the writing operation, wherein the object is displayed in place of the trace of writing.

6. The method according to claim 3, further comprising:
    upon detecting a tap operation of the object, displaying, on the touch screen, one of the plurality of images associated with an image identification number that is equal to the stored numerical value.

7. The method according to claim 6, further comprising:
    upon detecting a predetermined operation that is different from the first swipe operation, the second swipe operation, the writing operation, and the tap operation, causing the displayed object to be disappeared.

8. The method according to claim 3, further comprising:
    upon detecting a second writing operation of a second numerical value performed by the user, displaying, on the touch screen, a second object indicating a multi-digit value comprising the numerical value as an upper digit and the second numerical value as a lower digit, in place of the object, wherein
    the first and second swipe operations comprise swiping of the second object.

9. The method according to claim 1, wherein
    said displaying said at least one image among a plurality of images comprises displaying multiple images including said at least one image and another image associated with an image identification number immediately subsequent or prior to an image identification number of said at least one image.

10. The method according to claim 9, wherein the write operation is a write operation started within an area of said at least one image.

11. A method for displaying an image selected from a plurality of images on a touch screen, comprising:
    displaying, on the touch screen, at least one image among the plurality of images, each of the plurality of images being associated with different one of consecutive image identification numbers;
    each time detecting a tap operation on the touch screen while said at least one image is displayed, displaying, on the touch screen, an object indicating a number corresponding to a total number of tap operations that have been performed;
    when a first swipe operation in a first direction on the touch screen is detected after the tap operations, displaying, on the touch screen, one of the plurality of images associated with an image identification number that is equal to an image identification number of said at least one image plus the number corresponding to the total number; and
    when a second swipe operation in a second direction opposite to the first direction on the touch screen is detected after the tap operations, displaying, on the touch screen, one of the plurality of images associated with an image identification number that is equal to the image identification number of said at least one image minus the number corresponding to the total number.

12. The method according to claim 11, wherein said displaying upon detecting the first swipe operation is carried out upon determining that a largest image identification number of the plurality of images is equal to greater than the image identification number of said at least one image plus the number corresponding to the total number, and said displaying upon detecting the second swipe operation is carried out upon determining that a smallest image identification number of the plurality of images is equal to or less than the image identification number of said at least one image minus the number corresponding to the total number.

13. The method according to claim 11, wherein each of the first and second swipe operations comprises swiping of the object.

14. The method according to claim 11, further comprising:

upon detecting a predetermined operation that is different from the tap operation, the first swipe operation, and the second swipe operation, causing the displayed object to be disappeared.

15. The method according to claim 11, wherein said displaying said at least one image among a plurality of images comprises displaying multiple images including said at least one image and another image associated with an image identification number immediately subsequent or prior to an image identification number of said at least one image.

16. A method for displaying an image selected from a plurality of images on a touch screen, comprising:

displaying, on the touch screen, at least one image among the plurality of images, each of the plurality of images being associated with different one of consecutive image identification numbers;

upon detecting a tap and hold operation on the touch screen while said at least one image is displayed, displaying, on the touch screen, an object indicating a number corresponding to a period of time during which the tap and hold operation is being carried out;

when a first swipe operation in a first direction on the touch screen is detected after the tap and hold operation, displaying, on the touch screen, one of the plurality of images associated with an image identification number that is equal to an image identification number of said at least one image plus the total number; and when a second swipe operation in a second direction opposite to the first direction on the touch screen is detected after the tap and hold operation, displaying, on the touch screen, one of the plurality of images associated with an image identification number that is equal to the image identification number of said at least one image minus the total number.

17. The method according to claim 16, wherein said displaying upon detecting the first swipe operation is carried out upon determining that a largest image identification number of the plurality of images is equal to greater than the image identification number of said at least one image plus the number corresponding to the period of time, and said displaying upon detecting the second swipe operation is carried out upon determining that a smallest image identification number of the plurality of images is equal to or less than the image identification number of said at least one image minus the number corresponding to the period of time.

18. The method according to claim 16, wherein each of the first and second swipe operations comprises swiping of the object.

19. The method according to claim 16, further comprising:

upon detecting a predetermined operation that is different from the tap and hold operation, the first swipe operation, and the second swipe operation, causing the displayed object to be disappeared.

20. The method according to claim 16, wherein said displaying said at least one image among a plurality of images comprises displaying multiple images including said at least one image and another image associated with an image identification number immediately subsequent or prior to an image identification number of said at least one image.

\* \* \* \* \*